United States Patent
Wippler

(10) Patent No.: US 10,099,560 B2
(45) Date of Patent: Oct. 16, 2018

(54) SYSTEM AND METHOD FOR MAINTAINING THE SPEED OF A VEHICLE

(75) Inventor: Erik Anthony Wippler, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1357 days.

(21) Appl. No.: 13/014,451

(22) Filed: Jan. 26, 2011

(65) Prior Publication Data

US 2012/0191278 A1    Jul. 26, 2012

(51) Int. Cl.
| | | |
|---|---|---|
| *B60L 15/20* | (2006.01) | |
| *B60L 7/10* | (2006.01) | |
| *B60W 10/06* | (2006.01) | |
| *B60W 10/08* | (2006.01) | |
| *B60W 30/14* | (2006.01) | |
| *B60W 20/13* | (2016.01) | |

(52) U.S. Cl.
CPC .............. *B60L 7/10* (2013.01); *B60L 15/2027* (2013.01); *B60W 10/06* (2013.01); *B60W 10/08* (2013.01); *B60W 20/13* (2016.01); *B60W 30/143* (2013.01); *B60W 2510/244* (2013.01); *Y02T 10/6286* (2013.01); *Y02T 10/645* (2013.01); *Y02T 10/7275* (2013.01); *Y02T 90/16* (2013.01)

(58) Field of Classification Search
CPC .............................. B60L 7/10; B60L 15/2027
USPC ............................................. 700/22; 701/22
See application file for complete search history.

(56) References Cited

U.S. PATENT DOCUMENTS

| | | | |
|---|---|---|---|
| 2,790,961 | A | 4/1957 | Del Camp |
| 4,416,497 | A | 11/1983 | Brandsness et al. |
| 4,447,030 | A | 5/1984 | Nattel |
| 4,546,850 | A | 10/1985 | Litner |
| 4,720,044 | A | 1/1988 | Stemwedel, Jr. |
| 4,742,978 | A | 5/1988 | Ponticelli |
| 4,874,224 | A | 10/1989 | Gutman et al. |
| 4,964,048 | A | 10/1990 | Tanaka et al. |
| 5,104,071 | A | 4/1992 | Kowalski |
| 5,225,961 | A | 7/1993 | Zander et al. |

(Continued)

FOREIGN PATENT DOCUMENTS

| | | |
|---|---|---|
| EP | 0652621 A2 | 5/1995 |
| EP | 0713101 A2 | 5/1996 |

(Continued)

OTHER PUBLICATIONS

Illustrated Dictionary of Electronics, p. 414,2001.*

(Continued)

*Primary Examiner* — Minh Truong
*Assistant Examiner* — Michael E Butler
(74) *Attorney, Agent, or Firm* — Dinsmore & Shohl LLP

(57) ABSTRACT

A system for maintaining a selected speed of a vehicle is provided. The vehicle is powered in part by an electric motor and a battery. The electric motor is operable to drive in either a driving state or a charging state. In the charging state the polarity of the electric motor is modified so as to slow the vehicle down and supply power to the battery. A load bank is provided. The load bank is in electrical communication with the electric motor. The controller is further operable to direct power from the electric motor to the load bank when the electric motor is in the charging state.

8 Claims, 4 Drawing Sheets

(56) References Cited

U.S. PATENT DOCUMENTS

| | | | |
|---|---|---|---|
| 5,261,349 A | 11/1993 | Iino et al. | |
| 5,324,203 A | 6/1994 | Sano et al. | |
| 5,402,007 A * | 3/1995 | Center et al. | 290/40 B |
| 5,528,720 A | 6/1996 | Winston et al. | |
| 5,534,759 A | 7/1996 | Evans et al. | |
| 5,549,344 A | 8/1996 | Nishijima et al. | |
| 5,615,593 A * | 4/1997 | Anderson et al. | 91/24 |
| 5,676,338 A | 10/1997 | Warda et al. | |
| 5,691,078 A * | 11/1997 | Kozaki et al. | 324/428 |
| 5,694,793 A | 12/1997 | Nishimura et al. | |
| 5,735,041 A | 4/1998 | Zaguskin et al. | |
| 5,778,326 A | 7/1998 | Moroto et al. | |
| 5,799,262 A * | 8/1998 | Suzuki | 701/93 |
| 5,832,396 A | 11/1998 | Moroto et al. | |
| 5,834,922 A * | 11/1998 | Ikawa et al. | 320/136 |
| 5,839,703 A | 11/1998 | Tesar | |
| 5,883,484 A * | 3/1999 | Akao | 318/700 |
| 6,053,841 A * | 4/2000 | Koide et al. | 476/40 |
| 6,092,854 A | 7/2000 | Campbell | |
| 6,142,427 A | 11/2000 | Kogure et al. | |
| 6,154,081 A | 11/2000 | Pakkala et al. | |
| 6,229,090 B1 | 5/2001 | Kawaguchi et al. | |
| 6,236,172 B1 * | 5/2001 | Obara et al. | 318/139 |
| 6,305,733 B1 | 10/2001 | Rahmstorf et al. | |
| 6,335,861 B1 | 1/2002 | Ramsey, III et al. | |
| 6,357,881 B1 | 3/2002 | Robertson | |
| 6,364,394 B1 | 4/2002 | Davis, Jr. et al. | |
| 6,371,433 B2 | 4/2002 | Anderson et al. | |
| 6,453,132 B2 * | 9/2002 | Ishikura | 399/81 |
| 6,474,716 B2 | 11/2002 | Shikata et al. | |
| 6,515,229 B2 | 2/2003 | Aoki et al. | |
| 6,554,088 B2 * | 4/2003 | Severinsky et al. | 180/65.23 |
| 6,603,083 B2 | 8/2003 | Amari et al. | |
| 6,636,680 B2 | 10/2003 | Wu et al. | |
| 6,686,679 B1 | 2/2004 | Droulez | |
| 6,688,776 B2 | 2/2004 | Simmons et al. | |
| 6,724,613 B2 | 4/2004 | Doshita et al. | |
| 6,802,652 B1 | 10/2004 | Sacchetto et al. | |
| 6,834,900 B2 | 12/2004 | Wright | |
| 6,932,310 B1 | 8/2005 | Diss | |
| 7,053,305 B2 | 5/2006 | Takase et al. | |
| 7,117,964 B1 * | 10/2006 | Kuang et al. | 180/65.22 |
| 7,155,026 B2 | 12/2006 | Augustin, Sr. et al. | |
| 7,197,390 B2 | 3/2007 | Yuan et al. | |
| 7,517,249 B1 | 4/2009 | Zhang et al. | |
| 7,576,915 B2 | 8/2009 | Kurt | |
| 7,683,466 B2 | 3/2010 | Lee | |
| 7,710,073 B2 | 5/2010 | Yamauchi et al. | |
| 7,774,109 B2 | 8/2010 | Bajwa | |
| 7,874,689 B2 | 1/2011 | Tane et al. | |
| 7,876,489 B2 | 1/2011 | Gandhi et al. | |
| 2004/0090195 A1 | 5/2004 | Motsenbocker | |
| 2004/0164706 A1 * | 8/2004 | Osborne | 320/116 |
| 2004/0181323 A1 | 9/2004 | Yuan et al. | |
| 2004/0207350 A1 * | 10/2004 | Wilton et al. | 318/376 |
| 2005/0068039 A1 * | 3/2005 | Bertness | G01R 31/36 324/426 |
| 2005/0169003 A1 | 8/2005 | Lindahl et al. | |
| 2005/0179264 A1 * | 8/2005 | Ganev | H02P 9/48 290/40 C |
| 2006/0060399 A1 * | 3/2006 | Tabata et al. | 180/65.2 |
| 2006/0278453 A1 | 12/2006 | Moll et al. | |
| 2007/0118255 A1 * | 5/2007 | Wakashiro et al. | 701/22 |
| 2007/0169970 A1 * | 7/2007 | Kydd | 180/65.2 |
| 2007/0208468 A1 | 9/2007 | Sankaran et al. | |
| 2007/0233332 A1 | 10/2007 | Kawada et al. | |
| 2007/0236181 A1 * | 10/2007 | Palladino | G01R 31/3675 320/130 |
| 2007/0256872 A1 * | 11/2007 | Yamamuro | A61G 5/045 180/65.51 |
| 2008/0100129 A1 * | 5/2008 | Lubbers | 303/113.1 |
| 2008/0151531 A1 | 6/2008 | Richardson et al. | |
| 2008/0183348 A1 * | 7/2008 | Arita et al. | 701/22 |
| 2008/0191664 A1 * | 8/2008 | Abe | 320/137 |
| 2008/0279675 A1 * | 11/2008 | Ullyott | 415/1 |
| 2008/0290825 A1 * | 11/2008 | St-Jacques et al. | 318/380 |
| 2009/0008172 A1 * | 1/2009 | Aldrich, III | B60K 6/485 180/165 |
| 2009/0046453 A1 | 2/2009 | Kramer | |
| 2009/0132188 A1 * | 5/2009 | Watanabe | 702/64 |
| 2009/0168319 A1 | 7/2009 | Jeon et al. | |
| 2009/0174682 A1 | 7/2009 | Bowden et al. | |
| 2009/0184693 A1 * | 7/2009 | Owens | H02J 7/14 322/37 |
| 2009/0192661 A1 * | 7/2009 | O'Connor et al. | 701/22 |
| 2009/0200123 A1 | 8/2009 | Wang | |
| 2009/0243827 A1 | 10/2009 | Burke et al. | |
| 2009/0261782 A1 * | 10/2009 | Morita | 320/118 |
| 2009/0303695 A1 | 12/2009 | Buchstab et al. | |
| 2010/0090962 A1 | 4/2010 | Yoo et al. | |
| 2010/0110027 A1 | 5/2010 | Lipman et al. | |
| 2010/0156657 A1 | 6/2010 | Lee et al. | |
| 2010/0188193 A1 | 7/2010 | Uken et al. | |
| 2010/0204887 A1 * | 8/2010 | Ichinose et al. | 701/41 |
| 2010/0259063 A1 | 10/2010 | Wippler | |
| 2010/0262308 A1 * | 10/2010 | Anderson et al. | 700/287 |
| 2010/0264276 A1 | 10/2010 | Wippler et al. | |
| 2011/0109158 A1 * | 5/2011 | Olsen | 307/10.1 |
| 2012/0136594 A1 * | 5/2012 | Tang | G01R 31/3679 702/63 |
| 2012/0136595 A1 * | 5/2012 | Tang | H01M 10/425 702/63 |
| 2012/0316721 A1 * | 12/2012 | O'Connor et al. | 701/22 |
| 2013/0035819 A1 * | 2/2013 | Wolft | 701/22 |
| 2014/0361540 A1 * | 12/2014 | Knight | 290/44 |
| 2015/0307099 A1 * | 10/2015 | Dextreit | B60W 50/085 701/22 |

FOREIGN PATENT DOCUMENTS

| | | |
|---|---|---|
| EP | 0831249 A2 | 3/1998 |
| WO | WO-2006057889 A2 | 6/2006 |
| WO | WO-2010029315 A2 | 3/2010 |

OTHER PUBLICATIONS

Websters Third International Dictionary, p. 1325, 1971.*
IEEE Dictionary of Standards Terms, p. 629, 2000.*
Avaya, 2400 Series Digital Telephones, www.avaya.com/gcm/master-usa/en-us/products/offers/2400_series_digiital_telephon . . . Feb. 24, 2009.

* cited by examiner

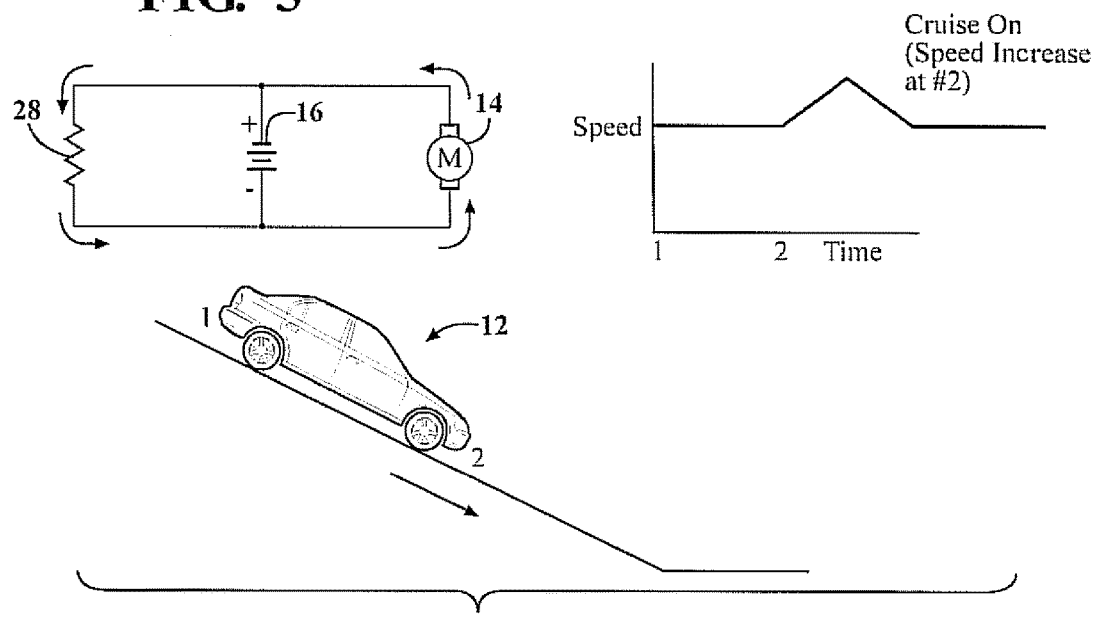
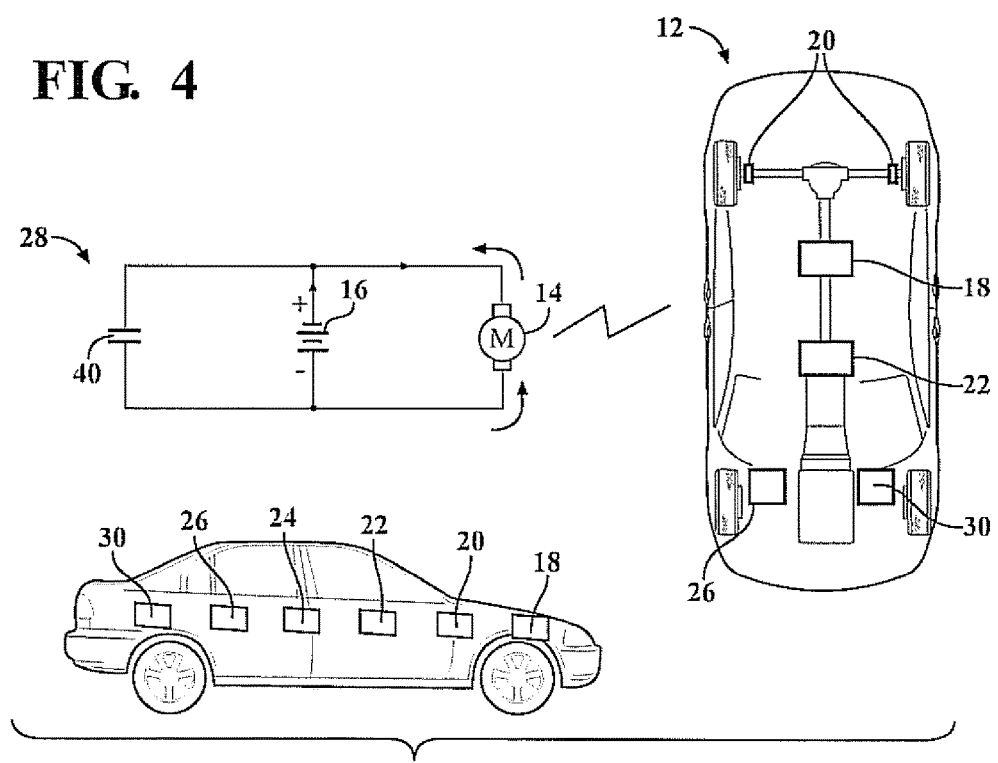

SYSTEM AND METHOD FOR MAINTAINING THE SPEED OF A VEHICLE

FIELD OF THE INVENTION

The invention relates to a system and method for maintaining a selected speed of a vehicle driven by an electric motor, and in particular an electric motor powered by a battery.

BACKGROUND OF THE INVENTION

Vehicles driven by both an electric motor and an internal combustion engine are currently known and used and commonly referenced as hybrid vehicles. These hybrid vehicles use a combination of the electric motor and the internal combustion engine to power the vehicle's drive train so as to minimize the use of carbon-based fuels.

The electric motor is operable to perform in a driving state and a charging state. In the driving state the electric motor supplies power to the vehicle's drive train so as to move the vehicle. In the charging state the polarity of the electric motor is modified. Thus, the electric motor in essence becomes a generator slowing the vehicle and simultaneously building a charge. The charge is then supplied to the battery.

Some hybrid vehicles have a cruise control system. The cruise control system is operable to actuate the electric motor between a driving state and a charging state so as to maintain a selected speed. In operation the cruise control actuates the electric motor in the driving state so as to supply power to the drive train and accelerate the vehicle to the selected speed. When the vehicle exceeds the selected speed, the cruise control actuates the electric motor in the charging state.

In the charging state, the polarity of the electric motor is modified, and some cases reversed. Modification of the electric motor's polarity causes resistance to the drive train and slowing the vehicle down until the vehicle returns to the selected speed. As the polarity of the electric motor is modified, not only is the vehicle slowed down, but an electric charge is generated. The electric charge is discharged to the battery so as to charge the battery. Thus, utilizing the electric motor to help slow the vehicle down may also replenish the battery. This process is commonly referred to in the art as regenerative braking.

With reference now to FIG. 1, diagram of a system representing a current hybrid vehicle is provided. In instances where the battery is fully charged it may not be desirable to reverse the polarity of the electric motor and charge the battery further. As is known to those skilled in the art, over-charging a battery may reduce the life of the battery, as well as the battery's performance.

Thus, it is currently known to disable the cruise control when the battery is fully charged so as to prevent the electric motor from supplying excess charge to the battery. In such instances, reduction of the vehicle's speed is accomplished solely by mechanical braking. Further, the driver must reactivate the cruise control.

Accordingly, it remains desirable to have a system that allows for the cruise control to remain engaged when the battery is full and the vehicle has exceeded the selected speed, without over-charging the battery.

SUMMARY OF THE INVENTION

The present invention provides a system and method for maintaining a selected speed of a vehicle using an electric motor even though the battery is fully charged. The vehicle may be driven in part or wholly by the electric motor. A battery is in electrical communication with the electric motor and is operable to supply power to the electric motor.

The electric motor is mechanically engaged with the vehicle's drive train so as to drive the vehicle. The electric motor is also in electrical communication with the battery and is operable to both receive power from the battery and charge the battery.

The electric motor is operable in both a driving state and a charging state. In the driving state the electric motor supplies power to the vehicle's drive train so as to move the vehicle at the selected speed. In the charging state the polarity of the electric motor is modified slowing the vehicle to the selected speed. As the polarity is modified, the electric motor builds a charge. The electric motor may supply the generated power to the battery so as to charge the battery.

The system includes a controller operable to actuate the electric motor between the driving state and the charging state. The system further includes a load bank in electrical communication with the electric motor. The controller is operable to direct power from the electric motor to the load bank when the electric motor is in a charging state. Specifically, the controller directs power from the electric motor to the load bank, bypassing the battery, when the power of the battery is above a predetermined threshold.

A first sensor senses and detects the state of the battery. Preferably the first sensor is operable to detect how much power is in the battery. The first sensor is in communication with the controller. The controller directs power generated by the electric motor so as to help preserve the life of the battery, keep the electric motor engaged with the vehicle's drive train, and maintain the vehicle's cruise control system engaged.

A method for maintaining a selected speed of a vehicle using an electric motor even though the battery is fully charged is also provided herein. The method includes the step of actuating the electric motor between the driving state and the charging state so as to maintain the selected speed. The method further includes the step of providing a load bank in electrical communication with the electric motor and directing power from the electric motor to the load bank when the electric motor is in the charging state and the battery's power is above a predetermined threshold.

BRIEF DESCRIPTION OF THE DRAWINGS

FIG. 3 is a schematic view of the system showing the discharge from the electric motor to the load bank bypassing the battery;

FIG. 4 is a schematic view showing the battery supplying power to the electric motor, and the electric motor mechanically engaged with the vehicle;

DETAILED DESCRIPTION OF THE INVENTION

Figure 1:
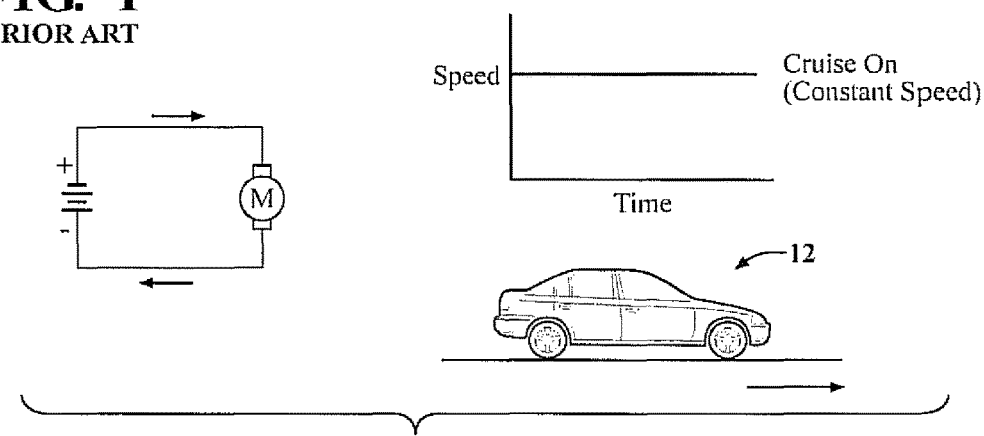
FIG. 1 is a diagram of a system for maintaining a selected speed of a hybrid vehicle of the prior art.
Figure 2:
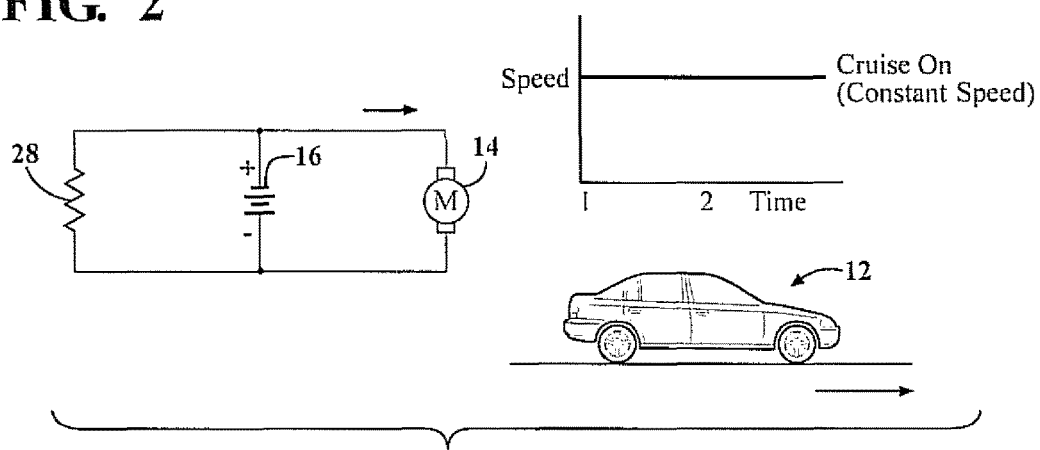
FIG. 2 is a diagram of a system showing the electric motor supplying power to the battery.

With reference first to FIGS. 2 and 3, a system 10 for maintaining a selected speed of a vehicle 12 using an electric motor 14 even though the battery 16 is fully charged is provided. The vehicle 12 includes an electric motor 14 and a battery 16. The battery 16 is in electrical communication with the motor and is operable to both supply power to the electric motor 14 and receive power from the electric motor 14.

The electric motor 14 may operate in either a driving state or a charging state. In the driving state the electric motor 14 supplies power to a drive train 18. In the charging state the polarity of the electric motor 14 is modified. It should be appreciated by those skilled in the art that the modification of the electric motor's 14 polarity generates a charge and also slows the vehicle 12 down. The charge may be supplied to the battery 16 so as to recharge the battery 16. The vehicle 12 may further include a mechanical brake 20 which is also operable to slow the vehicle 12 down.

It should be appreciated that the vehicle 12 may further include an internal combustion engine 22 and a transfer case 24 mechanically coupled to the drive train 18. The electric motor 14 and the internal combustion engine 22 are mechanically coupled to the transfer box. The transfer case 24 is operable to translate and combine power from both the electric motor 14 and the internal combustion engine 22 to drive the drive train 18 and move the vehicle 12.

The system 10 includes a controller 26 operable to actuate the electric motor 14 between the driving state and the charging state so as to maintain the vehicle 12 at the selected speed. The controller 26 may also process actuation of the mechanical brake 20 to actuate the electric motor 14 in the charging state. Thus, the vehicle 12 may be slowed down by both the actuation of the mechanical brake 20 and modification of the electrical motor's polarity. The controller 26 may be integrated into the vehicle's 12 electrical control unit, part of the vehicle's 12 cruise control system 10, or may be a standalone device dedicated to the actuation of the electric motor 14.

The system 10 further includes a load bank 28. The load bank 28 is placed in electrical communication with the electric motor 14. The load bank 28 is configured to receive power from the electric motor 14. The controller 26 is operable to selectively direct power from the electric motor 14 to the load bank 28 when the electric motor 14 is in the charging state.

A first sensor 30 is provided for detecting the state of the battery 16. The first sensor 30 is in communication with the controller 26. The first sensor 30 may include a voltmeter 32 and ammeter 34, the amount of volts and amps may be processed by the controller 26 to calculate how much power is available in the battery 16.

As described in the prior art, current systems 10, commonly referenced as cruise control systems 10, actuate the electric motor 14 between a charging state and a driving state so as to maintain a speed selected by the driver. In the driving state power is supplied by the electric motor 14 and/or the internal combustion engine 22 so as to move the vehicle 12 at the selected speed.

In certain instances, such as when the vehicle 12 is moving downhill, the vehicle 12 may exceed the desired speed. Current systems 10 actuate the electric motor 14 in the charging state wherein the polarity of the electric motor 14 is modified so as to in essence transform the electric motor 14 into a generator. The increased resistance is transferred to the transfer box, slowing the vehicle 12 down to the selected speed. Concurrently, the electric motor 14 generates power and charges the battery 16 so as to recoup energy.

However, in instances where the battery 16 is already full, further discharge to the battery 16 may damage the battery 16 performance. Accordingly, current hybrid vehicles 12 disable the cruise control so as to prevent the electric motor 14 from being actuated in the charging state. Thus, slowing the vehicle 12 is accomplished primarily through the use of the vehicle's 12 mechanical brake 20. Further, in many cases, actuation of the mechanical brake 20 may disengage the vehicle's 12 cruise control system 10.

The present invention overcomes this problem by providing a load bank 28. The controller 26 directs power generated by the electric motor 14 to the load bank 28. Thus the electric motor 14 remains engaged with the drive train 18 so as to slow the vehicle 12 down to the selected speed. Thus the vehicle's 12 cruise control system 10 is not disrupted, the electric motor 14 remains engaged, and the battery 16 is not over-charged.

Further application of the vehicle's 12 mechanical brake 20 is avoided, as the electric motor 14 remains engaged with the transfer case 24 and is used to slow the vehicle 12 down. Accordingly, the vehicle's 12 cruise control system 10 is not disengaged by actuation of the mechanical brake 20. Discharge from the electric motor 14 is directed to the load bank 28.

Not only is the controller 26 may be operable to discharge power from the electric motor 14 to the load bank 28 when the power of the battery 16 is fully charged, but may discharge power from the electric motor 14 to the load bank 28 when the battery 16 is above a predetermined threshold. Thus the system 10 eliminates the risk of charge from the electric motor 14 being directed to the battery 16 and overcharging the battery 16 and deteriorating the life and performance of the battery 16.

The system 10 may further include an input 36 in communication with the controller 26. The input 36 is operable to provide the selected speed to the controller 26. The input 36 may be a button mounted on a portion of the vehicle's 12 steering wheel. Such inputs 36 are commonly known and used and any such inputs 36 may be adoptable for use herein.

With reference now to FIGS. 3 and 4, illustrative embodiments of the load bank 28 are provided. With reference first to FIG. 3, the load bank 28 is a resistor 38. The load bank 28 is placed in parallel with the battery 16. As the battery 16 reaches a predetermined threshold, power generated by the electric motor 14 bypasses the battery 16 and is absorbed by the resistor 38. Thus electrical power which would otherwise overcharge the battery 16, is transformed into heat and dissipated.

With reference now to FIG. 4, a load bank 28 having a capacitor 40 is provided. Again, the capacitor 40 is placed in parallel with the battery 16. Electrical power generated by the electric motor 14 bypasses the battery 16 and is directed towards the capacitor 40.

It should be appreciated that the load bank 28 may include various combinations of capacitors 40 and resistors 38. For instance, the capacitor 40 may be placed in series with a plurality of resistors 38 or a plurality of capacitors 40 so as to store electrical power for later use, or discharge electrical power in the form of heat.

Figure 5:
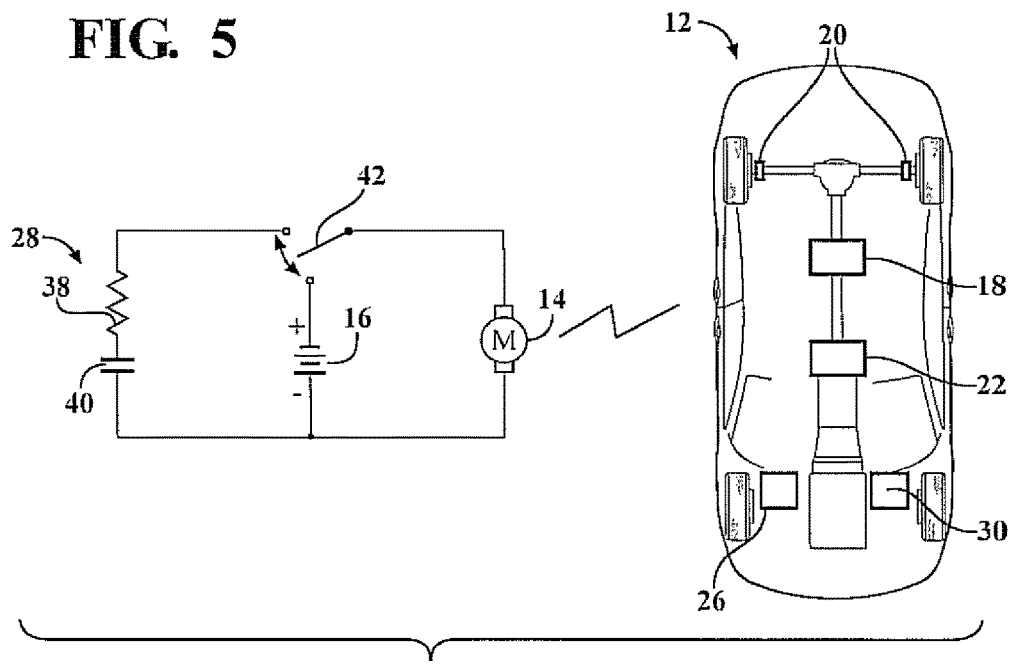
FIG. 5 is a schematic view showing a switch operable to direct power from the motor between the battery and the load bank.

With reference now to FIG. 5, the system 10 may further include a switch. The switch is in electrical communication with the electric motor 14. The switch operable to electrically connect the electric motor 14 to one of either the load bank 28 or the battery 16. Any switch currently known and used may be adapted for use herein, illustratively including an electro-magnetic switch. The switch may further be in communication with the controller 26. The controller 26 operable to actuate the switch so as to place the electric motor 14 in electrical communication with the load bank 28 when the electric motor 14 is operating in a charging state and the battery 16 power is above a predetermined threshold.

Figure 6:
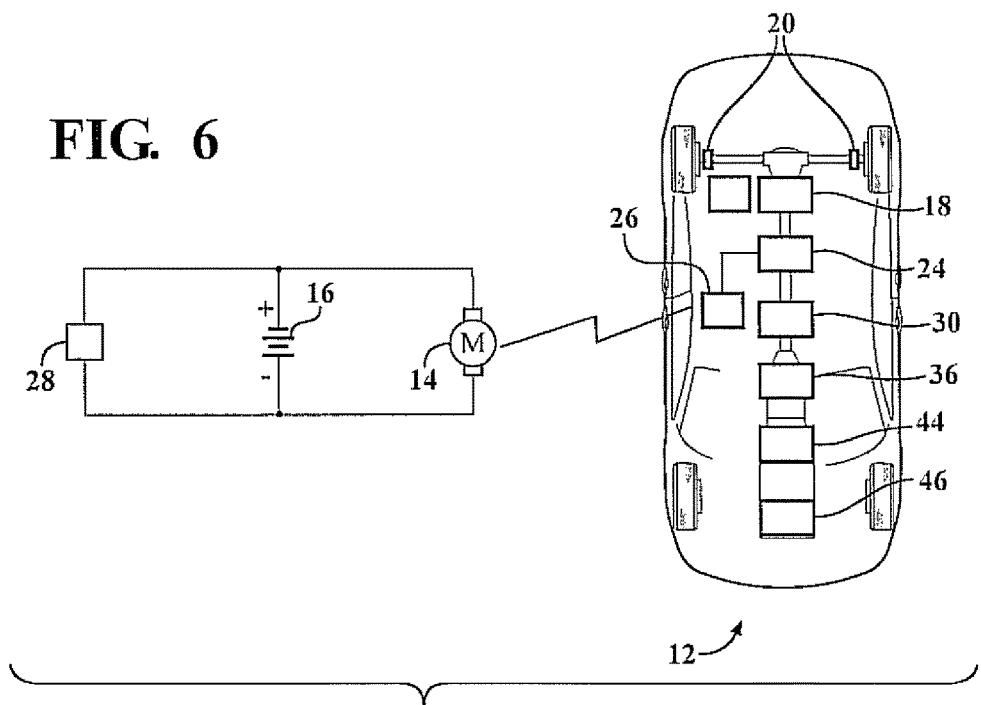
FIG. 6 is a schematic view of a second preferred embodiment of the system.

With reference now to FIG. 6, a second preferred embodiment of the system 10 is provided wherein like elements are referenced herein by the same number increased by. The system 10 of the second embodiment includes a processor 42 and a second sensor 44. The second sensor 44 is operable to detect the current speed of the vehicle 12.

The processor 42 is operable to process the selected speed, and the current speed of the vehicle 12 so as to determine the predetermined threshold. The predetermined threshold is the amount of force the electric motor 14 needs to generate to slow the vehicle 12 down from the current speed to the selected speed. This force may be equated to the amount of power generated by the electric motor 14 to decrease the speed to the selected speed.

For example, assume that the vehicle 12 is travelling downhill, and the driver selects a speed of forty-five miles per hour. In instances where the vehicle's 12 speed increases to forty-seven miles per hour. The processor 42 processes how much resistance the electric motor 14 must impart to slow the vehicle 12 down the selected speed. It should be appreciated that the resistance is made by modifying the polarity of the electric motor 14, and may be used to calculate how much power will be generated by slowing the vehicle 12 from forty-seven miles per hour to forty-five miles per hour.

In cases where the battery 16 is nearly fully charged, it may be desirable to direct the generated power to the load bank 28 so as to prevent over charging of the battery 16. Thus, the processor 42 compares the battery's 16 power with the calculated power generated by the electric motor 14 in order to slow the vehicle 12 to the selected speed, and establishes a predetermined threshold for directing power to the load bank 28.

Further assume in the instant scenario, that the addition of five watts would place the battery 16 at full power, and the processor 42 calculates that the electric motor 14 will generate eight watts of power. As the addition of eight watts would overcharge the battery 16, the processor 42 may establish a battery 16 threshold wherein electrical power is immediately directed towards the load bank 28.

Figure 7:
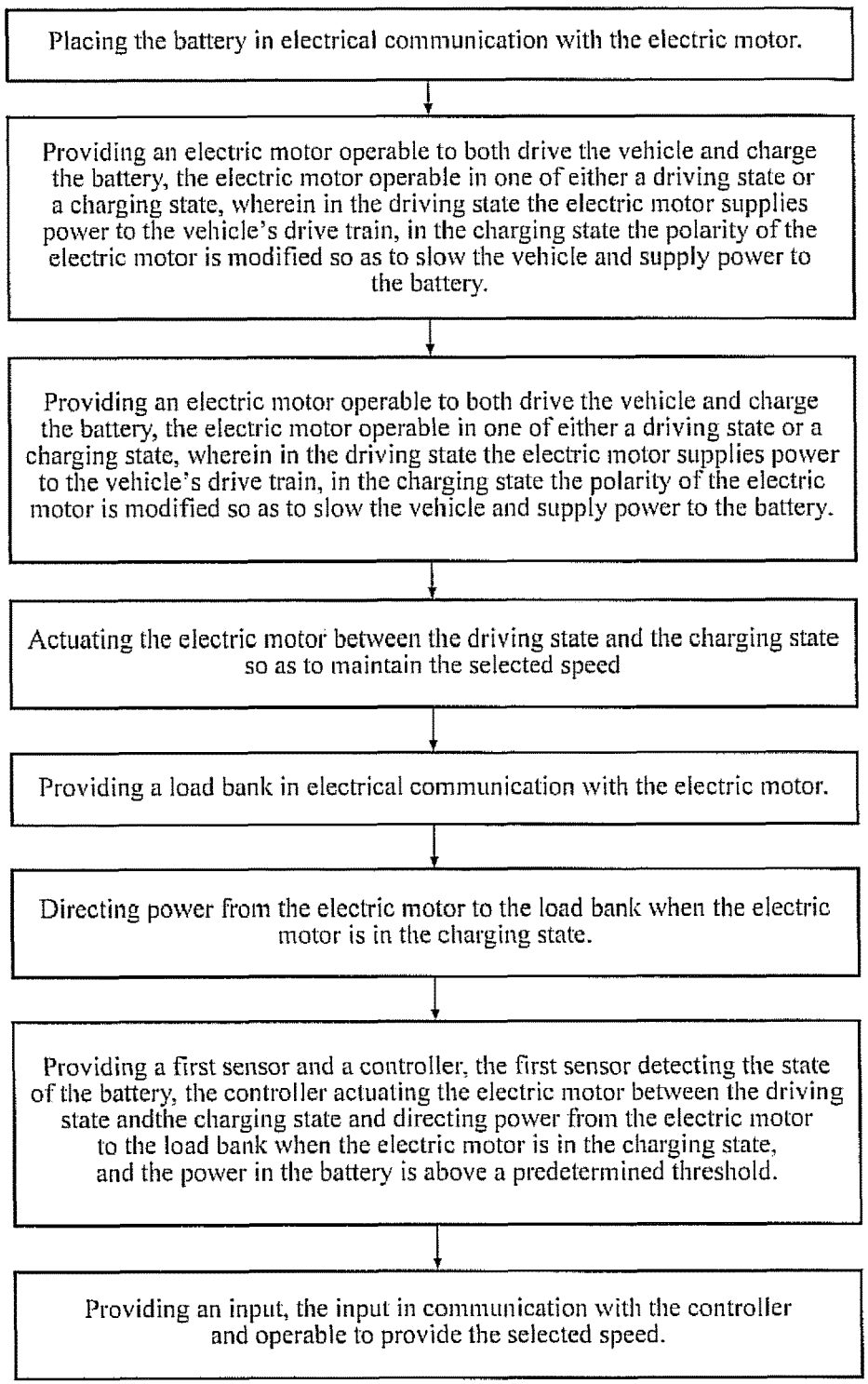
FIG. 7 is a diagram showing the steps of a method for maintaining a selected speed of a vehicle using an electric motor.

With reference now to FIG. 7, a method for maintaining a selected speed of a vehicle 12 having an electric motor 14 and a battery 16 is provided. The battery 16 is in electrical communication with the electric motor 14. The electric motor 14 is operable to both drive the vehicle 12 and charge the battery 16. The electric motor 14 is operable in one of either a driving state or a charging state. In the driving state the electric motor 14 supplies power to the vehicle's 12 drive train 18. In the charging state the polarity of the electric motor 14 is modified so as to slow the vehicle 12 and supply power to the battery 16. The method comprises the steps of actuating the electric motor 14 between the driving state and the charging state so as to maintain the selected speed. The method further includes the step of providing a load bank 28 in electrical communication with the electric motor 14 and directing power from the electric motor 14 to the load bank 28 when the electric motor 14 is in the charging state.

With reference now to step, the method proceeds to providing a first sensor 30 and a controller 26. The first sensor 30 is operable to detect the state of the battery 16. The controller 26 actuates the electric motor 14 between the driving state and the charging state. In the driving state the electric motor 14 is operable to power the vehicle 12. In the charging state, the electric motor 14 is operable to charge the load bank 28. The controller 26 actuates the electric motor 14 in the charging state and directs power generated by the electric motor 14 to the load bank 28 when the power in the battery 16 is above a predetermined threshold.

The load bank 28 is operable to store ro discharge electrical power. The load bank 28 may be a plurality of resistors 38 or capacitors 40 placed in parallel with the battery 16. For example, the load bank 28 may be a plurality of resistors 38 placed in parallel with the battery 16 and operable to transform the electric power to heat. In cases where a capacitor 40 is used, the capacitor 40 may store energy to supplement the vehicle's 12 electrical load.

The method may further include the step of providing an input 36. The input 36 in communication with the controller 26. The input 36 operable to provide a selected speed. The method may further include the step of processing the selected speed and the current speed to determine the predetermined threshold.

The invention is not restricted to the illustrative examples or embodiments described above. The examples or embodiments are not intended as limitations on the scope of the invention. Methods, apparatus, compositions, and the like described herein are exemplary and not intended as limitations on the scope of the invention. Changes therein and other uses will occur to those skilled in the art. As such, the scope of the invention is defined by the scope of the claims.

I claim:

1. A cruise control system for maintaining a selected speed of a vehicle, the vehicle having an electric motor and a battery, the battery in electrical communication with the electric motor, the electric motor operable to both drive the vehicle and charge the battery, wherein the electric motor supplies power to the battery, the cruise control system comprising:
   a controller operable to actuate the electric motor between the driving state and the charging state;
   a first sensor for detecting the state of the battery, the first sensor in communication with the controller;
   a load bank electrically connected to the electric motor and in parallel with the battery, the load bank configured to only receive a charge from the electric motor and further configured to either discharge the stored electrical charge or supplement the vehicle's electrical load; and
   a processor and a second sensor, the second sensor operable to detect a current speed of the vehicle, the processor configured to maintain the selected speed by actuating the electric motor between a driving state and a charring state, wherein in the driving state the processor is configured to signal the controller to actuate the electric motor so as to supply power to the vehicle's drive train, in the charging state the processor is configured to signal to the controller to modify the polarity of the electric motor so as to slow the vehicle, the processor further configured to process the selected speed and the current speed of the vehicle and the available store of the battery, wherein the controller is configured to direct power from the electric motor to the load bank only in instance, where the vehicle is operating in cruise control, the vehicle is above the selected speed, the vehicle is in the charging state and the available store of the battery is above a predetermined threshold, such that the cruise control system maintains the speed of the vehicle without excessively charging the battery.

2. The system as set forth in claim 1, wherein the first sensor is operable to detect the available store of the battery.

3. The system as set forth in claim 1, further including an input in communication with the controller, the input operable to provide the selected speed.

4. The system as set forth in claim 1, wherein the load bank is a resistor.

5. The system as set forth in claim 1, wherein the load bank is a capacitor.

6. The system as set forth in claim 1, wherein the predetermined threshold is the amount of force, generated by changing the polarity of the motor, necessary to slow the vehicle down to the selected speed within a desired period of time.

7. A method for maintaining a selected speed of a vehicle having an electric motor and a battery, the battery in electrical communication with the electric motor, the electric motor operable to both drive the vehicle and charge the battery, the electric motor operable in one of either a driving state or a charging state, wherein in the driving state the electric motor supplies power to the vehicle's drive train, in the charging state the polarity of the electric motor is modified so as to slow the vehicle and supply power to the battery, the method comprising the steps of:

selecting a speed;

actuating the electric motor between the driving state and the charging state so as to maintain the selected speed;

providing a load bank in electrical communication with the electric motor, the load bank configured to only receive a charge from the electric motor;

providing a first sensor and a controller, the first sensor detecting the state available store of the battery, the controller actuating the electric motor between the driving state and the charging state;

detecting the speed of the vehicle;

actuating the electric motor in the charging state when the speed of the vehicle is above the selected speed so as to slow the vehicle down to the selected speed; and directing power from the electric motor to the load bank only when; and speed has been selected, the electric motor is in the charging state, the power in the battery is above a predetermined threshold, and the speed of the vehicle is above the selected speed wherein the load bank is further configured to either discharge the stored electrical charge or supplement the vehicle's electrical load.

8. The method as set forth in claim 7, further including the step of providing an input, the input in communication with the controller and operable to provide the selected speed.

* * * * *

UNITED STATES PATENT AND TRADEMARK OFFICE
CERTIFICATE OF CORRECTION

PATENT NO. : 10,099,560 B2  
APPLICATION NO. : 13/014451  
DATED : October 16, 2018  
INVENTOR(S) : Erik Anthony Wippler Page 1 of 1

It is certified that error appears in the above-identified patent and that said Letters Patent is hereby corrected as shown below:

On the Title Page

In Page 2, Item (56), Other Publications, delete "Avaya, 2400 Series Digital Telephones, www.avaya.com/gcm/master-usa/en-us/products/offers/2400_series_*digiital*_telephon . . . Feb. 24, 2009." and insert --Avaya, 2400 Series Digital Telephones, www.avaya.com/gcm/master-usa/en-us/products/offers/2400_series_*digital*_telephon . . . Feb. 24, 2009--.

In the Specification

In Column 6, Line 10, after "store", delete "ro" and insert --or--, therefor.

In the Claims

In Column 6, Claim 1, Line 64, delete "instance, where" and insert --instances where:--, therefor.

In Column 6, Claim 1, Line 66, after "state", insert --,--.

In Column 8, Claim 7, Line 19, after "speed", insert --;--.

Signed and Sealed this  
First Day of January, 2019

Andrei Iancu  
*Director of the United States Patent and Trademark Office*